July 12, 1955  M. HATTAN  2,712,912
SAFETY BARRIER
Filed April 20, 1946  2 Sheets-Sheet 1
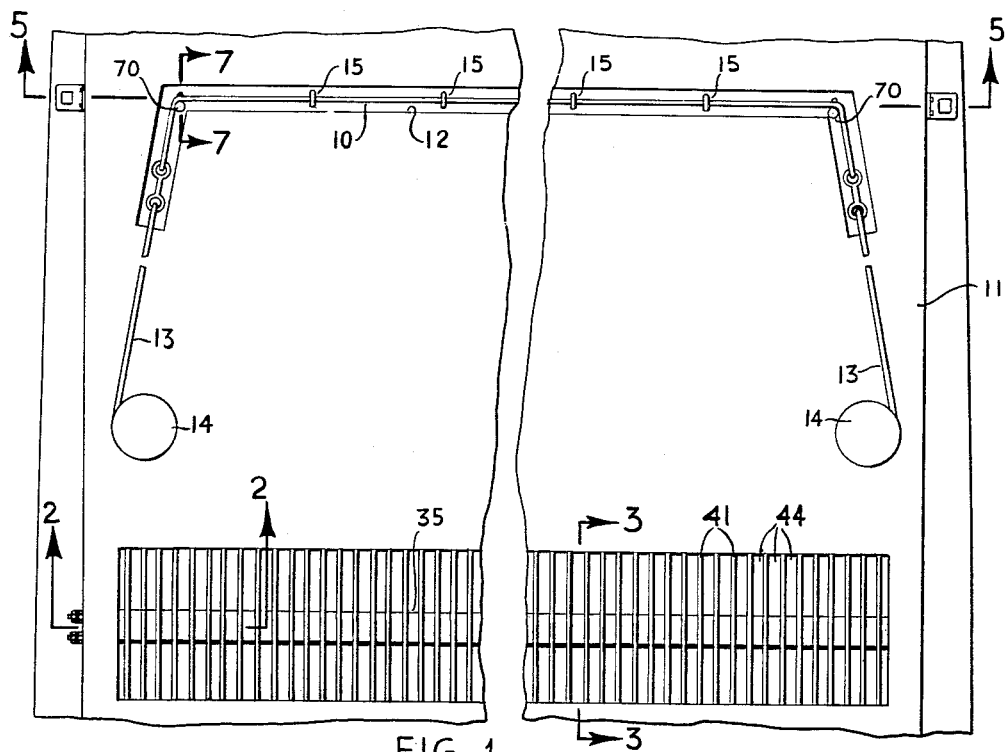
FIG. 1
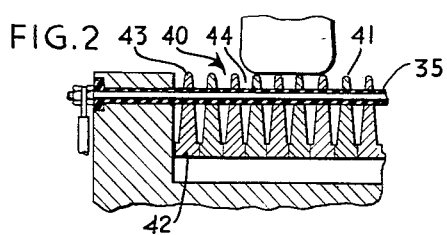
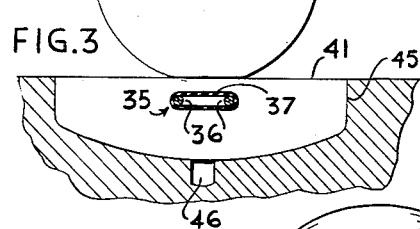
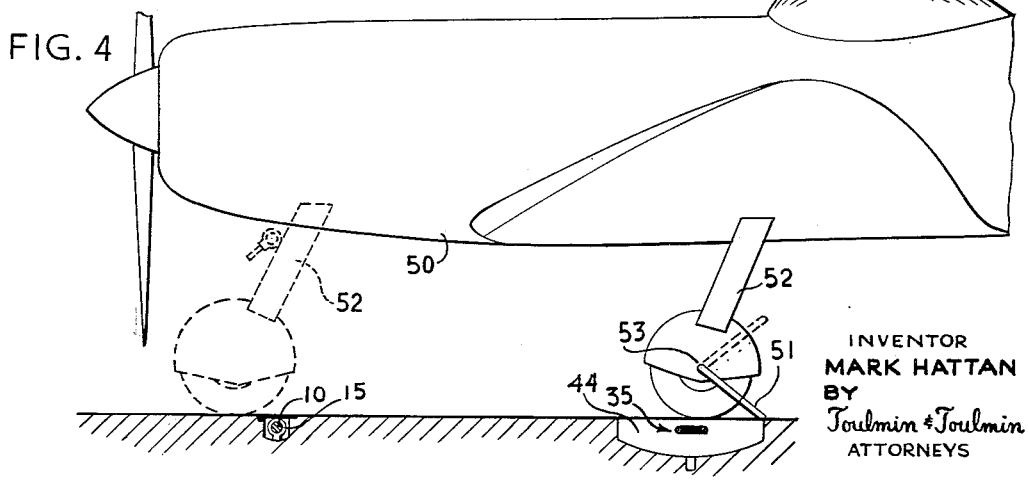
INVENTOR
MARK HATTAN
BY
Toulmin & Toulmin
ATTORNEYS July 12, 1955 — M. HATTAN — 2,712,912
SAFETY BARRIER
Filed April 20, 1946 — 2 Sheets-Sheet 2
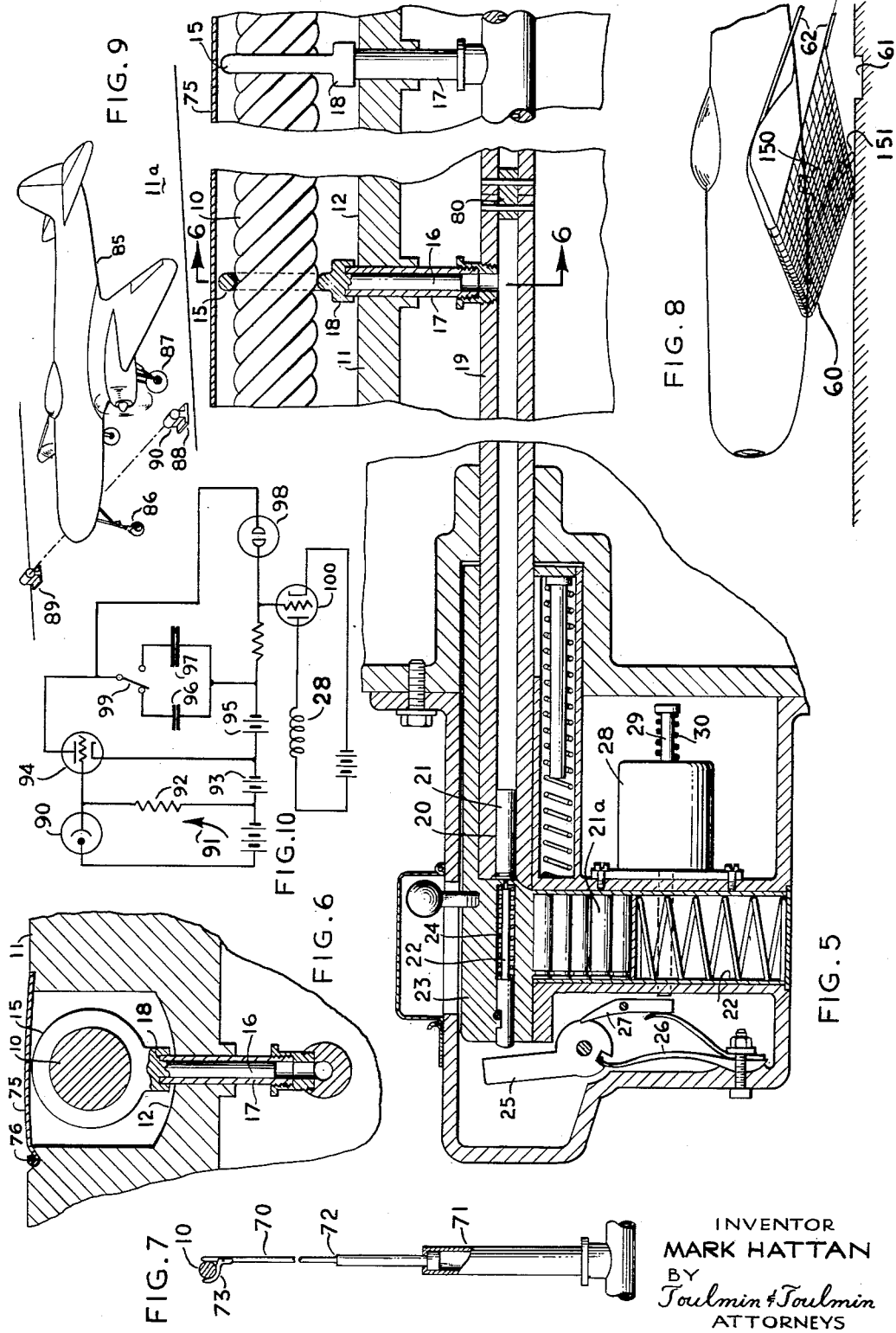
INVENTOR
MARK HATTAN
BY
Toulmin & Toulmin
ATTORNEYS

United States Patent Office 2,712,912
Patented July 12, 1955

2,712,912

SAFETY BARRIER

Mark Haffan, Dayton, Ohio, assignor of one-half to Sidney A. Pierson, Chicago, Ill.

Application April 20, 1946, Serial No. 663,739

19 Claims. (Cl. 244—110)

This invention relates to a safety barrier adapted for arresting movement of aircraft in those cases when they have overrun other normally active arresting means or in those cases when it is not possible for aircraft to safely make a takeoff due to some unusual condition arising during the run period just before takeoff. This invention is adaptable for use either on aircraft carriers or for commercial installations to provide a safety barrier at the end of a runway.

Safety barriers have not been used on the commercial airfields because they have not been entirely satisfactory or safe in their action to provide for absolute arresting of an aircraft in case of difficulty during a takeoff run. However, safety barriers are in use on aircraft carriers to prevent aircraft from running off the runway in those cases when the aircraft over-shoots the normal arresting devices, and to prevent the aircraft from running into parked aircraft on the flight-deck of the carrier. However, the safety barriers that are in use are not wholly satisfactory because they are manually controlled and their operation is largely dependent upon the human factor of judgment, which errs frequently. If a pilot should overrun the normal arresting means at the after end of the flight-deck of an aircraft carrier, and still has sufficient flight speed, he can pull upwardly off the flight-deck and recircle for a landing. However, if the person in charge of operating the safety barrier should believe the pilot intends to land, and raises the safety barrier, it is highly probable that an accident would occur because the lowering of the safety barrier would not be occasioned rapidly enough to permit the pilot to clear the safety barrier and again rise for a new landing effort.

In one form of this invention, however, the safety barrier is not controlled in any way by the personnel of the aircraft, but rather is actuated by the incoming aircraft, so that if a pilot should desire to leave the flight-deck and attempt another landing rather than depend upon the action of the safety barrier for stopping the airplane after having overrun the normal arresting devices, the fact that his aircraft leaves the flight-deck will be sufficient reason for preventing action of the safety barrier. Thus, the use of the safety barrier is entirely dependent upon the pilot's will, and not the will of an independent operator who must attempt to co-ordinate his thinking with that of the pilot.

An object of this invention is to provide a safety barrier for arresting aircraft which may be wholly under the control of the pilot of the aircraft.

Still another object of the invention is to provide a safety barrier for arresting aircraft that is adapted to throw the safety barrier upwardly toward the aircraft after the propellers of the aircraft have passed over the safety barrier but before the landing-gear has reached the barrier to insure that the safety barrier will engage the landing-gear of the aircraft and will not be cut by the action of the propellers.

Another object of the invention is to provide a safety barrier system for arresting forward movement of aircraft wherein there is provided an actuator for throwing a safety barrier into the path of travel of an aircraft, and wherein the actuator is positioned relative to the safety barrier that actuation of the actuator by forward movement of the aircraft will operate the safety barrier to throw the same into the path of movement of the aircraft at the proper time to cause the safety barrier to rise toward the aircraft after the propeller of the aircraft has passed over the safety barrier but before the landing-gear or any other arresting means of the aircraft has passed beyond the safety barrier so that the safety barrier will engage the rigid parts of the aircraft to halt the forward progress of the same.

Still another object of the invention is to provide a safety barrier system for arresting the forward movement of aircraft in accordance with any of the foregoing objects wherein substantially instantaneous operation of the movement of the safety barrier toward the aircraft is obtained upon actuation thereof.

Still another object of the invention is to provide a safety barrier system in accordance with the foregoing object wherein the safety barrier is actuated by an explosive charge, such as gunpowder.

Another object of the invention is to provide a safety barrier system in accordance with the foregoing objects wherein the system is electrically controlled and is actuated by movement of an aircraft relative to the actuator for the safety barrier.

Still another object of the invention is to provide a safety system for arresting the forward movement of an aircraft which includes a safety barrier and an actuating system for elevating the barrier in front of an aircraft wherein the safety barrier and the actuating means for operating the same are spaced relative to one another so that when the actuating means is operated by an aircraft passing over or through the same, the safety barrier will be caused to rise in front of a main arresting object on the aircraft and behind objects which are most likely to be damaged by engagement with the safety barrier to thereby so time the rise of the safety barrier relative to the forward movement of the aircraft that it will miss those objects which may be damaged and will engage only the main arresting projection or object on the aircraft.

Still another object of the invention is to provide a safety system in accordance with the foregoing object wherein the safety barrier is adapted to rise in front of the main landing gear of the aircraft for arresting a forward movement of the same but wherein the actuation of the safety barrier is rendered responsive only to a selected actuator carried on the aircraft to thereby obtain actuation of the safety barrier only when the aircraft is in a predetermined position relative to the safety barrier.

Further objects and advantages will become apparent from the drawings and the following description.

Figure 1 is a plan view illustrating a part of the flight-deck of an aircraft carrier illustrating the arrangement of this invention thereon.

Figure 2 is a cross-sectional view illustrating the supporting grill-work and actuator of this invention taken substantially along line 2—2 of Figure 1.

Figure 3 is a cross-sectional view taken along line 3—3 of Figure 1.

Figure 4 is an elevational view, partially in cross-section, illustrating diagrammatically the relationships between the elements of this invention and an aircraft for proper operation of the safety barrier system.

Figure 5 is a partial cross-sectional view of apparatus for causing the safety barrier to rise in front of the aircraft, and is taken substantially along line 5—5 of Figure 1.

Figure 6 is a cross-sectional view taken along line 6—6 of Figure 5.

Figure 7 is a cross-sectional view illustrating means for holding the safety barrier in elevated position and is taken substantially along line 7—7 of Figure 1.

Figure 8 is an elevational view showing schematically an arrangement for causing a net to rise in front of the aircraft.

Figure 9 is a diagrammatic view illustrating a light-sensitive mechanism for operating the safety barrier system.

Figure 10 is a schematic electrical wiring diagram for the apparatus illustrated in Figure 9 so as to render the same effective either for a tricycle landing-gear or regular two-wheel landing-gear.

The safety barrier system of this invention consists of a cable 10 that extends transversely across the flight-deck 11 of an aircraft carrier or across a runway of a commercial or private field. The cable 10 is positioned within a recess 12 provided transversely in flight-deck 11, or the runway, so that normally the cable 10 will not be engaged by aircraft passing thereover.

The cable 10 is preferably constructed of a multiplicity of steel wires, and is joined at opposite ends to shock cables 13 of undrawn nylon that are suitably secured adjacent opposite sides of the flight-deck 11, or runway, by means of the members 14.

The cable 10 is encircled with a plurality of eyelets 15 which are adapted to cause the cable to rise from the recess 12 in the manner hereinafter described.

The eyelets 15 are more clearly shown in Figures 5 and 6 wherein each of the eyelets 15 are illustrated as being provided with a cylindrical extension or plunger 16 that is slidably received within the tubes 17 extending through the bottom wall of the recess 12. The plungers 16 are of sufficiently close fit within the tubes 17 to provide a gas seal therebetween, and yet high pressure gas will cause the plungers 16 to be expelled from the end of the tubes 17 in an upward direction to thus carry the cable 10 upwardly and out of the recess 12.

The eyelets 15 are each provided with an annular recess 18 that fits over the end of the tubes 17 to prevent entrance of moisture into the tubes 17 whenever such may collect in the recess 12.

The tubes 17 are suitably secured to a conduit 19 that extends transversely across the flight-deck 11, or runway, and beneath the same. High pressure gas is adapted to be supplied into the tube 19 for expelling the plungers 16 out of the tubes 17. It may be understood that all of the tubes 17 may be supplied from a single conduit 19 as illustrated herein, or separate sources of high pressure gas supply can be directed to each of the tubes 17 individually, whichever appears to be the most expedient.

To cause the safety barrier or cable 10 to rise in front of the main landing-gear of an aircraft, or other arresting means thereon, with a sufficiently rapid movement that it can engage the main landing-gear of the aircraft and yet be caused to rise after the propellers or other forward objects of the aircraft have passed over the same, it is necessary for the movement of the cable 10 to be extremely rapid. Such rapidity of movement of the cable or barrier 10 can be occasioned only by a sudden application of high fluid pressure, particularly gas, into the conduit 19 to expel the plungers or plugs 16 at a right rate of movement. To obtain this high rate of development of gas pressure in the conduit 19, an explosive cartridge is detonated within the tube 19 so that the gaseous pressure developed upon detonation of the cartridge will expel the plugs or plungers 16 from the tubes 17 in substantially the same manner as a bullet is expelled from a gun.

The tube 19 is therefore provided with a cartridge chamber 20 at one end thereof for receiving a blank cartridge 21.

An electrically operated firing mechanism is provided for detonating the cartridge 21. This mechanism may consist of a firing-pin 22 carried within the breech member 23, the firing-pin being normally retained out of engagement with the cartridge 21 by means of the spring 24.

The breech 23 is movable relative to the tube 19 to allow for expelling of the cartridge 21 through a side entry in the breech (not illustrated). Auxiliary cartridges 21a may be carried in a clip for delivery into the breech 23 when a cartridge has been detonated.

The firing-pin 22 is operated by the firing member 25 and the spring 26 when the latch-lock 27 is released upon actuation of an electric actuator or solenoid 28. The electric actuator or solenoid 28 carries a plunger 29 for engaging the latch-lock 27, and is normally held out of engagement therewith by means of a spring 30.

The electrically operated firing mechanism hereinbefore described does not constitute a part of this invention since any conventional electrically operated firing mechanism can be used for the purpose of detonating the cartridge 21. However, any firing mechanism can be used that is capable of being operated from a position remote from the firing mechanism.

To operate the electrically operated firing mechanism and thus detonate the cartridge 21, an electric actuator is positioned transversely across the flight-deck 11, or the runway, as the case may be. This electric actuator 35 consists of a pair of wires 36 contained within a shroud 37 and maintained in spaced relationship by suitable tensioning means at one end of the wires, not illustrated. The wires 36 are connected with the electric solenoid 28 of the firing mechanism, and as long as the wires remain separated, as illustrated in Figure 3, there will be no electric circuit provided to the solenoid 28. However, when the shroud 37 should be deformed for any reason, causing the wires 36 to contact at any point along the length thereof, electric circuit will be made to the solenoid 28 to cause actuation of the electric firing mechanism.

The actuator 35 is supported transversely of the flight-deck 11 by means of a grate 40. The grate 40 consists of a plurality of individual grate members 41 that are disposed adjacent one another as illustrated in Figure 2. Each of the members 41 has a base portion 42 which contacts the adjacent base portion of adjacent members, and has a vertically tapered portion 43 extending upwardly from the base portion 42 to thereby provide spaces 44 between adjacent members 41. The grill members 41 are disposed within a recess 45 provided in the flight-deck 11 so that the upper edges of the tapered portions 43 are at surface level with the flight-deck. The grate 40 thus carries the aircraft in any movement across the flight-deck. A suitable drain passage 46 may be provided in the recess 45 to allow for drainage of the same.

It has previously been stated herein that the safety barrier system of this invention is under control of the pilot of the aircraft. To render the safety barrier system thus controllable, each aircraft 50 is provided with one or more drag sticks 51, as illustrated in Figure 4. These drag sticks 51 may extend downwardly from the main landing-gear 52 of the aircraft and be positioned upon ball-and-socket joints 53 to allow for angular movement of the drag stick relative to the landing-gear. If desired, the drag stick may extend downwardly from the fuselage of the aircraft, a suitable ball-and-socket joint being provided to connect the drag stick with the fuselage. Also, suitable hydraulic jacks can be provided for raising and lowering the drag sticks 51 to place them in operable position as illustrated in Figure 4 or to place them in an inoperative position as illustrated by the broken line therein.

The drag sticks 51 on the aircraft 50 are adapted to enter the spaces 44 in the grate 40 when the aircraft passes over the grate 40 to strike the actuator 35 and thus cause the wires 36 to contact for making electric circuit to the electrically operated firing mechanism to detonate the cartridge 21.

If the pilot desires not to use the safety barrier system for any reason, he need not lower the drag stick 51 and thus will prevent any operation of the safety barrier system. Thus, the operation of the safety barrier system is completely under control of the pilot of the aircraft.

In Figure 1, it will be noted that the safety barrier or safety cable 10 is positioned forwardly of the actuator 35 relative to the direction of movement of an aircraft during landing or takeoff operations. The distance between the cable 10 in its at-rest position and the actuator 35 is established such that the cable 10 will be caused to rise to a height of approximately 4 feet in the time interval lapsing between the instant of actuation of the actuator 35 and the movement forward of the main landing-gear of the aircraft to a position above the safety barrier 10 so that the landing-gear, or other arresting means on the aircraft, will be engaged by the safety barrier or cable 10.

The foregoing functioning of the safety barrier system is illustrated in Figure 4 wherein there is shown in full lines the position of the main landing-gear 52 of the aircraft 50 when the drag stick 51 is ready to operate the actuator 35. After the actuator 35 is operated by engagement thereof with the drag stick 51, the safety cable or barrier 10 will be expelled by the detonation of the cartridge 21 to cause the barrier 10 to rise toward the aircraft so that by the time the landing-gear 52 reaches the dotted-line position illustrated in Fig. 4, the safety cable will have risen to a point to insure its engagement by the arresting mechanism or the main landing-gear 52. It will also be noted that the safety cable or barrier 10 is disposed behind the propeller of the aircraft 50 when the drag stick 51 is ready to operate the actuator 35, thus insuring against the cable 10 rising ahead of the propeller and becoming entangled therein.

In the case of a tricycle landing-gear, the main landing-gear will carry the drag stick 51 so that the cable 10 will be caused to rise toward the aircraft between the nose-wheel of the tricycle landing-gear and the main landing-gear.

While it has been described herein that the drag stick 51 is carried upon the main landing-gear of the aircraft, yet it is not necessary that the drag stick be located at this position. The essential point is that the position of the drag stick on the aircraft shall always be the same distance from the projection of the aircraft to be avoided by the safety barrier to insure operation of the actuator 35 at the proper moment to cause the cable 10 to always begin to rise a predetermined distance ahead of the main landing-gear 52 or other arresting means provided on the aircraft. In this respect, the drag stick 51 could just as well be located at the tail of the aircraft as at the forward end thereof, the actuator 35 in this case being positioned a greater distance rearwardly of the barrier 10. Also, the actuator 35 could be placed ahead of the barrier 10 to be operated by a drag stick on the forward end of the aircraft to cause the barrier to rise at the proper moment to engage an arresting means on the rear portion of the aircraft.

In Figure 8 there is illustrated a slightly modified arrangement of the invention wherein there is shown a net 60 that has been thrown from a net cavity 61. The net has the ends thereof connected to shock cables 62, and the net may thus be adapted to stretch over the wings of the aircraft to insure against damage of the aircraft. In operation, the net is thrown upwardly from the recess 61 in exactly the same manner as heretofore disclosed and described with regard to the barrier 10. This arrangement is particularly useful for halting the forward movement of aircraft that have a very small landing-gear or none at all. The present trend in jet aircraft is to eliminate or substantially eliminate the conventional landing gear. Hence, in aircraft of this type a small landing-wheel partially housed in the fuselage of the aircraft may be all the landing-gear required, such as that indicated at 150. The drag stick 151 may in this case be extended from the fuselage and be retractable therein.

Because of the variation in the speed of aircraft in landing, a cable thrown upwardly at the proper moment to engage the main landing-wheels of an aircraft travelling at a rate of approximately 100 miles an hour during landing or takeoff may have a tendency to drop before the main landing-gear of an aircraft travelling at a low landing speed, such as 35 miles an hour, particularly in connection with a head-wind, has traversed the necessary distance to engage the cable. Therefore, to avoid this difficulty, there may be provided at opposite ends of the cable 10 a pair of posts 70 more clearly illustrated in Figure 7. These posts 70 are slidably received within a socket 71 and are adapted to be expelled out of the socket 71 by means of gaseous pressure delivered within the cylindrical socket 71. The gas pressure may be developed in the same manner as heretofore described with reference to movement of the safety cable 10, or another suitable source of gas pressure may be utilized for this purpose. The post 70, when in elevated position, is adapted to remain in this position to hold the cable 10 in its suitable elevated position so that the landing-gear of the aircraft must engage the cable 10 whenever it is thrown upwardly. The post 70 may be provided with a ball-and-socket joint 72, if desired, to allow for movement of the post when the cable 10 is struck by the landing-gear of the aircraft, or a releasable clip 73 may be provided on the upper end of the post 70 to allow for release of the cable 10 from the post 70 when the cable is engaged by the landing-gear on the aircraft.

To enclose the cable 10 from the elements, a suitable weather-cover 75 may be provided over the recess 12 and hinged adjacent the recess by means of a hinge 76 to allow the cover to be thrown open upon the cable 10 being expelled from the recess.

If desired, an electric firing mechanism can be provided at each end of the conduit 19 so that the high pressure gas charge delivered into the conduit 19 will not be required to traverse the full length thereof before acting throughout the length of the cable to expell the plungers 16. Under such circumstances, a barrier 80 may be provided substantially midway between opposite ends of the tube 19 so that one explosive charge will not have a detrimental effect on the other in case they should not fire absolutely simultaneously. Also, in case of a long length of the tube 19, the plugs or plungers 16 can be made of varying length, the longest plungers being those closest to the explosive charge 21 to insure the ends of the plugs remaining within the tubes 17 until the explosive charge has an opportunity to react on those plungers most remote from the explosive charge.

In Figure 9 there is illustrated a modified arrangement of electrical means for actuating the electrically operated firing mechanism hereinbefore described. In this arrangement there is diagrammatically illustrated an aircraft 85 having a tricycle landing-gear consisting of the nose-gear 86 and the main landing-gear 87. A light-sensitive cell 90 is positioned along one side of the flight-deck 11a and is adapted to be carried within a suitable support or standard 88 to receive the light beam from a light source 89. The light-sensitive cell 90 is adapted to be hooded in any suitable manner to minimize, if not avoid, the effect of daylight illumination upon the light-sensitive cell. To render the same effective at all times, the light source 89 shall be of intensity above any maximum daylight illumination.

The light-sensitive cell 90 is connected in a suitable electrical system for actuating the solenoid 28 of the electrically operated firing mechanism when the light beam is interrupted. The interruption of the light beam can be occasioned by the landing-gear 87 or by any other projection provided on the aircraft 85 specifically for this purpose.

To adapt the interruption of the light beam between the source 89 and the light-sensitive cell 90 for operation of the electrically operated firing mechanism to all aircraft regardless of whether they are provided with a bi-wheel landing gear or a tricycle landing-gear, it is necessary that provision be made to render the electrical system controlled by the light-sensitive cell 90 effective either to a first interruption of the light beam or to a second interruption thereof, the latter in connection with the use of tricycle landing-gear. If the nose-gear 86 were allowed to operate the safety barrier when the light-beam to the cell 90 was interrupted, the safety barrier or cable 10 would be thrown in front of the nose-gear, causing the cable to be extended in triangular fashion, which in the case of multiple-motored aircraft places the cable 10 in a position subjecting it to the danger of cutting by the propellers of the aircraft. Also, engagement of the nose-gear by the cable 10 establishes a condition wherein the nose-gear acts as a pivot about which the aircraft can rotate in a skid, which is not favorable. Thus, to insure that the safety cable or barrier 10 will always engage only the main landing-gear 87, an interruption of the light beam by the nose-gear 86 shall be rendered ineffective for operating the electrically operated firing mechanism heretofore described.

This can readily be accomplished in the manner illustrated in the schematic wiring diagram shown in Figure 10 wherein the light-sensitive cell 90 causes a current flow in the direction of the arrow 91 to obtain a voltage drop across the resistor 92 which in effect counterbalances the effect of the biasing battery 93 to render the tube 94 non-conductive for current between the filament and the plate thereof. However, when the light source is interrupted the current flow in the light-sensitive cell circuit stops to thereby allow the biasing battery to be rendered effective to bias the grid of the tube 94 and allow current flow through the tube 94 from the battery 95.

The current impulse thus obtained can be rendered effective either upon a single impulse or upon a plurality of impulses. The current impulse can be used to charge a small condenser 96 or a large condenser 97. The small condenser 96 is of capacity which allows a discharge through the glow tube 98 upon a single impulse from the tube 94 whereas to obtain a discharge through the condenser 97, two impulses are required. A selector switch 99 is provided to render the system effective on a single impulse when connected with the condenser 96 or upon two impulses when connected with the condenser 97.

The discharge through the glow tube 98 can bias the grid of the tube 100 to cause current flow between the filament and the plate and thus energize an electric actuator or the solenoid 28.

With the foregoing system effective, a control operator can set the system to render it effective either for actuation by aircraft having tricycle landing gear or for aircraft having conventional bi-wheel landing gear. Thus, a single actuator, consisting of the light-sensitive cell 90 and the light source 89 may be used for actuating the electric firing mechanism for the safety barrier 10.

It will of course be understood that the electrical system disclosed in Fig. 10 may be altered to accommodate actuation of the electrical firing mechanism for the cartridge 21 from various combinations of impulses of the electrical system, the final impulse being always the one to render the electrically operated firing mechanism effective.

In the safety barrier system disclosed in Figure 9, the light-sensitive cell 90 and the light source 89 will be positioned relative to the safety barrier or cable 10 in the same manner as previously referred to with regard to the actuator 35 illustrated in Figure 1 to thus insure the barrier 10 rising in front of the proper projecting element from the aircraft, which in this instance is the main landing-gear 87.

It will be understood that the mechanical arrangement of the apparatus disclosed and described herein can be altered from that as illustrated without departing from the spirit of the invention, and that all modifications that fall within the scope of the appended claims are intended to be included herein.

Having thus fully described my invention, what I claim as new and desire to secure by Letters Patent is:

1. In a safety barrier system for aircraft, flexible barrier means adapted to be elevated from a runway strip, means for elevating said barrier into the path of movement of an aircraft on the runway strip, electrically sensitive means operably connected with said elevating means to render the same active, and adjacent a runway means for causing an electric impulse to said electrically sensitive means actuated by means on an aircraft adjacent to the runway moving relative thereto to positively render said elevating means operative with the aircraft in a predetermined position relative to said barrier means.

2. In a safety barrier system for aircraft, flexible barrier means adapted to be elevated from a runway strip, means for elevating said barrier into the path of movement of an aircraft on the runway strip, means operably connected with said last-mentioned means to forcibly actuate the same, and electrically sensitive actuating means operably connected with said last-mentioned means and responsive to an electric impulse caused by an aircraft moving relative to impulse producing means connected with said actuating means for operating said elevating means to cause the same to elevate said barrier means with the aircraft in a predetermined position relative thereto.

3. In a safety barrier system for aircraft, flexible barrier means adapted to be elevated from a runway strip, means for elevating said barrier into the path of movement of an aircraft on the runway strip, means operably connected with said last-mentioned means to forcibly actuate the same, electrically sensitive actuating means operably connected with said last-mentioned means and responsive to an electric impulse caused by an aircraft moving relative to the impulse producing means connected with said actuating means for operating said elevating means to cause the same to elevate said barrier means with the aircraft in a predetermined position relative thereto, said barrier means being positioned relative to said impulse producing means to cause elevation of the barrier means in a predetermined position in advance of arresting means on the aircraft and in arear of other obstructions on the aircraft which might be engaged by said barrier when in elevated position.

4. In a safety barrier system for aircraft, flexible barrier means adapted to be elevated from a runway strip, means for elevating said barrier into the path of movement of an aircraft on the runway strip, means operably connected with said last-mentioned means to forcibly actuate the same, electrically sensitive actuating means operably connected with said last-mentioned means and responsive to an electric impulse caused by an aircraft moving relative to the impulse producing means connected with said actuating means for operating said elevating means to cause the same to elevate said barrier means with the aircraft in a predetermined position relative thereto, said barrier means being positioned forwardly of the impulse producing means actuated by an aircraft in the direction of travel of the aircraft to elevate the barrier means into the air a predetermined position in advance of arresting means on the aircraft and in arear of other obstructions on the aircraft which might be engaged by said barrier when in elevated position.

5. In a universal safety barrier system for aircraft irrespective of the type of landing gear on it, flexible barrier means adapted to be elevated from a runway strip, means for elevating said barrier means into the path of movement of an aircraft on the runway strip, an actuating means for operating said last-mentioned means and rendered active upon movement of an aircraft relative thereto, said actuating means being positioned relative to said barrier means that actuation thereof by movement of the aircraft relative thereto causes said barrier means to rise from the runway strip a predetermined distance in advance of arresting means carried on the aircraft and in arear of any other obstruction on the aircraft that might be engaged by said barrier when in elevated position.

6. In a safety barrier system for aircraft, flexible barrier means positioned transversely across a runway strip and adapted to be elevated from the runway strip in front of arresting means on an aircraft passing thereover, conduit means for receiving high pressure fluid having a plurality of discharge chambers positioned below said barrier means, means extending from each of the discharge chambers into engagement with said barrier means, an electric firing mechanism for detonating an explosive charge, means for conducting the gases developed upon detonation of the explosive charge into said conduit means for delivery into said exhaust chambers to throw the members therein outwardly for elevating the barrier means, and an electric actuator effective transversely of the runway strip for operating said electric firing mechanism and operated by movement of an aircraft relative thereto.

7. In a safety barrier system for aircraft, flexible barrier means positioned transversely across a runway strip and adapted to be elevated from the runway strip in front of arresting means on an aircraft passing thereover, conduit means for receiving high pressure fluid having a plurality of discharge chambers positioned below said barrier means, means extending from each of the discharge chambers into engagement with said barrier means, an electric firing mechanism for detonating an explosive charge, means for conducting the gases developed upon detonation of the explosive charge into said conduit means for delivery into said exhaust chambers to throw the members therein outwardly for elevating the barrier means, and an electric actuator effective transversely of the runway strip for operating said electric firing mechanism and operated by movement of an aircraft relative thereto, said actuator being positioned relative to said barrier means that operation thereof by an aircraft causes said barrier means to rise a predetermined distance in advance of arresting means carried on the aircraft which rendered the actuator effective.

8. In a safety barrier system for aircraft, flexible barrier means positioned transversely across a runway strip and adapted to be elevated from the runway strip in front of arresting means on an aircraft passing thereover, conduit means for receiving high pressure fluid having a plurality of discharge chambers positioned below said barrier means, means extending from each of the discharge chambers into engagement with said barrier means, an electric firing mechanism for detonating an explosive charge, means for conducting the gases developed upon detonation of the explosive charge into said conduit means for delivery into said exhaust chambers to throw the members therein outwardly for elevating the barrier means, and an electric actuator engaged by means extending from an aircraft moving relative thereto for operating the actuator thereby and cause said barrier to rise when the aircraft causing actuation thereof is in a predetermined position over said barrier means.

9. In a safety barrier system for aircraft, flexible barrier means positioned transversely across a runway strip and adapted to be elevated from the runway strip in front of arresting means on an aircraft passing thereover, conduit means for receiving high pressure fluid having a plurality of discharge chambers positioned below said barrier means, means extending from each of the discharge chambers into engagement with said barrier means, an electric firing mechanism for detonating an explosive charge, means for conducting the gases developed upon detonation of the explosive charge into said conduit means for delivery into said exhaust chambers to throw the members therein outwardly for elevating the barrier means, and an electric actuator comprising a photocell and light source effective transversely of the runway strip for interruption by means extending from an aircraft for operation of said electric firing mechanism thereby to cause said barrier to rise when an aircraft is in a predetermined position over said barrier means with the arresting means a predetermined position in arrears of the barrier means relative to the forward advancement of the aircraft.

10. In a safety barrier system for aircraft, flexible barrier means positioned transversely across a runway strip and adapted to be elevated from the runway strip in front of arresting means on an aircraft passing thereover, conduit means for receiving high pressure fluid having a plurality of discharge chambers positioned below said barrier means, means extending from each of the discharge chambers into engagement with said barrier means, an electric firing mechanism for detonating an explosive charge, means for conducting the gases developed upon detonation of the explosive charge into said conduit means for delivery into said exhaust chambers to throw the members therein outwardly for elevating the barrier means, and an electric actuator comprising a photocell and light source effective transversely of the runway strip for interruption by means extending from an aircraft for operation of said electric firing mechanism thereby to cause said barrier to rise when an aircraft is in a predetermined position over said barrier means with the arresting means a predetermined position in arrears of the barrier means relative to the forward advancement of the aircraft, and means for selectively rendering said electric actuator responsive to one or more interruptions.

11. In a universal safety barrier system for aircraft having various kind of landing gear, flexible barrier means adapted to be elevated from a runway strip, means for elevating said barrier into the path of movement of an aircraft on the runway strip, electrically sensitive means operably connected with said elevating means to render the same active, and means adjacent a runway for causing an electric impulse to said electrically sensitive means actuated by means of an aircraft adjacent to the runway and positioned relative to said barrier means that movement of the aircraft relative to said impulse means always causes said barrier means to rise from the runway strip in a predetermined position relative to aircraft passing over the barrier means in arear of the propeller of the aircraft.

12. In a universal safety barrier system for aircraft having various kind of landing gear, flexible barrier means adapted to be elevated from a runway strip, means for elevating said barrier into the path of movement of an aircraft on the runway strip, electrically sensitive means operably connected with said elevating means to render the same active, and means adjacent a runway for causing an electric impulse to said electrically sensitive means actuated by means of an aircraft adjacent to the runway and positioned relative to said barrier means that movement of the aircraft relative to said impulse means always causes said barrier means to rise from the runway strip in a predetermined position relative to aircraft passing over the barrier means in arear of auxiliary nose wheel landing gear.

13. In a universal safety barrier system for aircraft having various kind of landing gear, flexible barrier means adapted to be elevated from a runway strip, means for elevating said barrier into the path of movement of an aircraft on the runway strip, electrically sensitive means operably connected with said elevating means to render the same active and means adjacent a runway for causing an electric impulse to said electrically sensitive means actuated by means of an aircraft adjacent to the runway and positioned relative to said barrier means that movement of the aircraft relative to said impulse means always causes said barrier means to rise from the runway strip in a predetermined position relative to aircraft passing over the barrier means in advance of the main landing gear of the aircraft but in arear of the propeller or auxiliary nose wheel landing gear.

14. In a safety barrier system for aircraft having various kind of landing gear, flexible barrier means adapted to be elevated from a runway strip, means for elevating said barrier into the path of movement of an aircraft on the runway strip, means for delivering a blast of high pressure gas to said elevating means for causing the same to operate rapidly, electrically sensitive means operably connected with said blast-delivering means to render the same active, and means adjacent the runway strip for causing an electric impulse to said electrically sensitive means actuated by means on an aircraft adjacent to the runway strip moving relative to said impulse means to positively render said blast-delivering means active with the aircraft in a predetermined position relative to said barrier means.

15. In a universal safety barrier system for aircraft having various kind of landing gear, flexible barrier means adapted to be elevated from a runway strip, means for elevating said barrier into the path of movement of an aircraft on the runway strip, means for delivering a blast of high-pressure gas comprising an explosive charge to said elevating means for causing the same to operate rapidly, electrically sensitive means operably connected with said blast-delivering means to render the same active, and means adjacent the runway strip for causing an electric impulse to said electrically sensitive means actuated by means on an aircraft adjacent to the runway strip moving relative to said impulse means to positively render said blast-delivering means active with the aircraft in a predetermined position relative to said barrier means.

16. In a universal safety barrier system for aircraft having various kind of landing gear, a flexible barrier cable positioned transversely of the runway strip, conduit means extending transversely of the runway strip below said barrier cable, means dischargeable from said conduit means and engaging said barrier cable for elevating the same upon discharge of said dischargeable means from said conduit means, means for releasing high-pressure fluid into said conduit means to discharge said dischargeable means therefrom, and actuating means operably connected with said last-mentioned means and actuated by an aircraft on the runway strip upon relative movement thereof thereto to actuate said fluid-releasing means when the aircraft is in a predetermined position relative to said actuating means.

17. In a universal safety barrier system for aircraft having various kind of landing gear, a flexible barrier cable positioned transversely of the runway strip, conduit means extending transversely of the runway strip below said barrier cable, means dischargeable from said conduit means and engaging said barrier cable for elevating the same upon discharge of said dischargeable means from said conduit means, means for releasing high-pressure fluid into said conduit means to discharge said dischargeable means therefrom, electrically sensitive means operably connected with said fluid-releasing means to render the same active, and means adjacent the runway for causing an electric impulse to said electrically sensitive means actuated by means of an aircraft adjacent to the runway strip moving relative to said impulse means to positively render said fluid releasing means active when an aircraft is in a predetermined position relative to said barrier means.

18. In a safety barrier system for aircraft, flexible barrier means adapted to be elevated from a runway strip, means for elevating said barrier into the path of movement of an aircraft on the runway strip, means operably connected with said last-mentioned means to forcibly actuate the same, electrically sensitive actuating means operably connected with said last-mentioned means and responsive to an electric impulse caused by an aircraft moving relative to impulse-producing means connected with said actuating means for operating said elevating means to cause the same to elevate said barrier means with the aircraft in a predetermined position relative thereto, and means elevated with said barrier means for detaining the same in its elevated position.

19. In a universal safety barrier system for aircraft having various kind of landing gear, flexible barrier means adapted to be elevated from a runway strip, means for elevating said barrier into the path of movement of an aircraft on the runway strip, electrically sensitive means operably connected with said elevating means to render the same active, and means adjacent the runway and positioned rearwardly of said barrier means relative to the direction of movement of an aircraft on the runway for causing an electric impulse to said electrically sensitive means when actuated by means on an aircraft adjacent to the runway strip moving forwardly relative to said impulse means to positively render said elevating means operative with the aircraft in a predetermined position relative to said barrier means.

References Cited in the file of this patent

UNITED STATES PATENTS

| | | |
|---|---|---|
| 1,259,060 | West | Mar. 12, 1918 |
| 1,789,653 | Hoyt | Jan. 20, 1931 |
| 2,364,527 | Haygood | Dec. 5, 1944 |
| 2,371,670 | Beddow | Mar. 20, 1945 |